May 21, 1963  R. S. JOHNSON  3,090,676
CATALYST FEED CONTROL DEVICE FOR CATALYTIC CONVERTERS
Filed Nov. 21, 1960
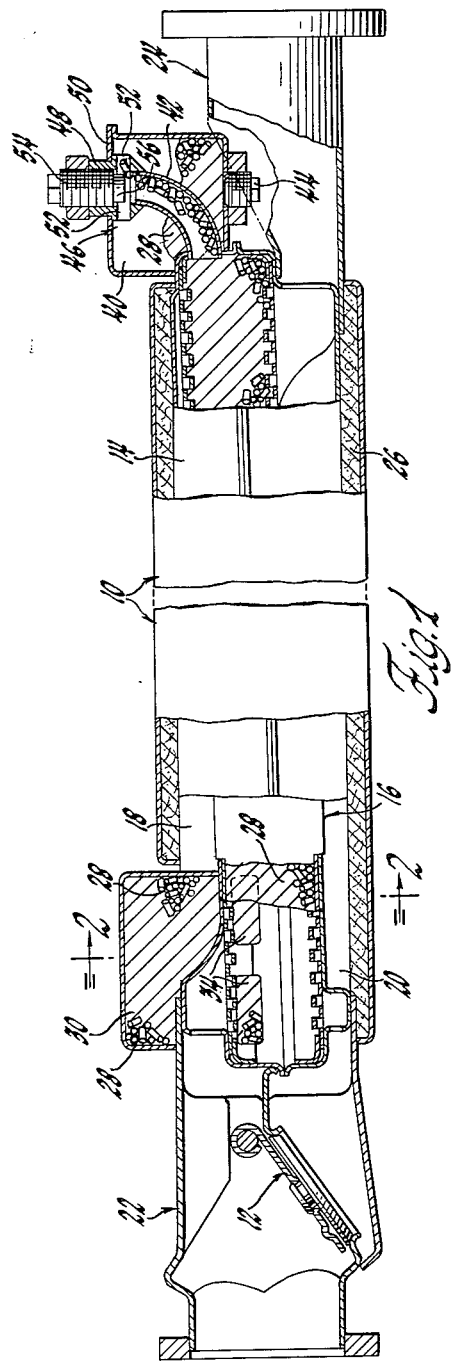
INVENTOR.
Ralph S. Johnson
BY
R. P. Barnard
ATTORNEY

3,090,676
CATALYST FEED CONTROL DEVICE FOR CATALYTIC CONVERTERS

Ralph S. Johnson, Rochester, Mich., assignor to General Motors Corporation, Detroit, Mich., a corporation of Delaware
Filed Nov. 21, 1960, Ser. No. 70,579
3 Claims. (Cl. 23—288)

The present invention relates to a catalytic converter having an improved device for feeding catalytic particles through the converter to insure the converter retains a full charge at all times.

More specifically, the present invention is an improvement in copending application Serial No. 49,256, Johnson, filed August 12, 1960. Both the earlier Johnson as well as the present device utilize an inclined catalyst bed. As noted in the earlier application, the inclined bed was developed to reduce the vertical displacement of the converter and thereby enhance its commercial utility. In the earlier Johnson application a hopper or catalyst reservoir is provided at the rear end of the converter so as to communicate with the most elevated end of the catalyst bed. In this way the catalyst particles are intended to be fed by gravity to the inclined bed where they will gradually work their way to the lower end thereof.

Contrary to expectation, it is found in use, probably due to air flow and vibration, that the catalyst particles instead of working their way to the lower end of the inclined catalyst bed move toward the higher end and thereby leave the lower end of the converter bed only partially filled with catalyst particles.

Accordingly, the present invention relates to a catalyst feed device whereby the catalyst is fed into the converter at the lower end of the catalyst bed and continuously removed from the upper end. In addition, the present invention includes means for regulating the flow of catalyst particles to maintain a freshly charged converter at all times.

The details as well as other objects and advantages of the present invention will be apparent from a perusal of the detailed description which follows.

In the drawings:

FIGURE 1 is a sectioned plan view of a catalytic converter embodying the subject invention; and FIGURE 2 is a view along line 2—2 of FIGURE 1.

A catalytic converter is shown generally at 10. The basic details of construction of the converter are the same as shown and described in the aforenoted copending Johnson application as well as in copending application Serial No. 67,569, Johnson, filed November 7, 1960, relating to an exhaust flow diverting valve arrangement indicated generally at 12. Briefly, converter 10 includes a main converter casing 14 within which an inclined catalyst bed 16 is disposed to provide oppositely tapering inlet and outlet passages 18 and 20. Inlet and outlet casings 22 and 24 are respectively secured to opposite ends of catalyst bed 16. The exhaust gas flow diverting valve 12 is pivotally mounted in inlet casing 22 and will be described only so far as to note that when the valve is in its normal position, as shown in FIGURE 1, exhaust gas will enter the inlet casing and be directed to flow through tapered inlet chamber 18 through the catalyst bed 16 and be exhausted through outlet chamber 20. To prevent damage to the catalyst bed in the event of overheating, valve 12 is moved to its upper position in which exhaust gas flow is diverted around converter bed 16 and flows directly to exhaust passage 20.

Main casing 14 is suitably wrapped with an insulating material 26 to reduce the transmission of heat to the vehicle body.

As seen in FIGURE 1, catalyst bed 16 is adapted to be filled with catalyst particles 28 which are preferably about 1/16 of an inch in diameter and average on a 1/4 of an inch in length. For the converter to function properly, the catalyst bed must be maintained substantially full of the catalyst particles. Inasmuch as a certain deterioration occurs in the catalyst particles due to vibration-induced abrasion as well as a loss of chemical effectiveness of the particles due to continued use, it is desirable to provide means for continually refilling the catalyst bed. As shown in copending application Serial No. 49,256, Johnson, this has been achieved by filling the catalyst bed from the high or rear end and permitting gravity to feed the catalyst particles to the lower end of the bed. As already noted, it has been found in practice that presumably air flow coupled with normal vibration causes the catalyst particles to move rearwardly and upwardly within the catalyst bed against the force of gravity thereby creating a reduced particle volume in the lower end of the catalyst bed.

In the present invention, a particle reservoir or hopper 30 is provided at the inlet end of the converter and openly communicates through slots 32 and 34 in both sides of bed 16 whereby the lower end of the bed is maintained full of catalyst particles. Hopper 30 includes an opening 36 within which a removable plug 38 is threaded to permit the hopper to be periodically filled with catalyst particles.

A similar hopper or reservoir 40 is mounted on the rear end of catalyst bed 16 and internally communicates therewith through an upwardly curved tube 42. The movement of the catalyst particles through catalyst bed 16 is such that they will move from the lower or front end of the catalyst bed to the rear or upper end thereof and out through tube 42 into reservoir 40. As it is necessary to refill particle supply reservoir 30, so it is necessary to empty hopper 40 to periodically remove the particles that have been moved thereinto. Exhaust hopper 40 is also provided with a removable plug 44 disposed in the bottom thereof for emptying the particles therefrom.

It is desirable to control the rate of particle flow through the catalyst bed in order that such flow bears some relationship to the tendency of the particle volume within the bed to be reduced as well as bearing a relationship to the loss of chemical activity of the particles. Accordingly, an adjustable orifice device 46 coacts with particle exhaust tube 42. Orifice device 46 includes an internally threaded boss 48 secured within hopper wall 50 such that radially opening passages 52 communicate the upper end of tube 42 with the interior of reservoir 40. A plug 54 is threadably adjustable within boss 48 and includes an end 56 adapted to coact with the upper end of tube 42 to thereby control the rate of catalyst particle passage flow through the tube. It is apparent that by moving the threaded plug 54 inwardly or outwardly the particle flow may be decreased or increased in accordance with the operating requirements of the particular converter.

I claim:

1. A catalytic converter apparatus comprising an elongated casing having a gas inlet at the front end and a gas outlet at the rear end, a catalyst bed disposed within and extending substantially throughout the length of the casing, a catalyst particle reservoir disposed above the catalyst bed at the gas inlet end thereof and having a passage for conveying particles to said gas inlet end of the catalyst bed, a second reservoir for exhausted catalyst particles above the catalyst bed at the gas outlet end thereof and communicating with said gas outlet end of the catalyst bed, first means for supporting said catalyst bed in said casing whereby the gas flow between said gas inlet and outlet passages passes through the catalyst bed in a direction from the gas inlet to the gas outlet so as to urge the catalyst particles to move along the bed to the second reservoir, and second means located between the second reservoir and the catalyst bed for controlling the rate of catalyst particle flow from said bed to said second reservoir, said second means including a device for adjusting the degree of communication between said bed and said second reservoir.

2. A catalytic converter apparatus as set forth in claim 1 in which said second means includes a tube communicating with the gas outlet end of the catalyst bed and the second reservoir, and an adjustable orifice means coacting with the tube to control the flow of catalyst particles therethrough.

3. A catalytic converter apparatus as set forth in claim 1 in which the orifice means comprises a boss founded on the second reservoir and enclosing one end of said tube, said boss including radially extending passages connecting the tube with the associated reservoir, and a plug adjustably supported by the boss to vary the size of the radial passages.

References Cited in the file of this patent

UNITED STATES PATENTS

| | | |
|---|---|---|
| 2,747,976 | Houdry | May 29, 1956 |
| 2,772,147 | Bowen et al. | Nov. 27, 1956 |
| 2,776,875 | Houdry | Jan. 8, 1957 |
| 2,898,202 | Houdry et al. | Aug. 4, 1959 |
| 2,946,651 | Houdry | July 26, 1960 |
| 2,991,160 | Claussen | July 4, 1961 |

FOREIGN PATENTS

| | | |
|---|---|---|
| 142,388 | Austria | Feb. 15, 1935 |